(12) United States Patent
Koo et al.

(10) Patent No.: US 11,646,581 B2
(45) Date of Patent: May 9, 2023

(54) POWER ADAPTERS WITH MULTIPLE CHARGING PORTS

(71) Applicant: SEMICONDUCTOR COMPONENTS INDUSTRIES, LLC, Phoenix, AZ (US)

(72) Inventors: Gwanbon Koo, Fremont, CA (US); Youngbae Park, Taipei Zhongsan (TW); BongGeun Chung, Siheung-si (KR)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 150 days.

(21) Appl. No.: 17/191,115

(22) Filed: Mar. 3, 2021

(65) Prior Publication Data

US 2022/0285955 A1    Sep. 8, 2022

(51) Int. Cl.
| | |
|---|---|
| H02J 3/18 | (2006.01) |
| H02J 7/00 | (2006.01) |
| H01H 9/54 | (2006.01) |
| H02M 3/335 | (2006.01) |
| H02M 1/00 | (2006.01) |

(52) U.S. Cl.
CPC ........... *H02J 3/1821* (2013.01); *H01H 9/541* (2013.01); *H02J 7/0045* (2013.01); *H02J 2207/20* (2020.01); *H02M 1/0048* (2021.05); *H02M 3/33576* (2013.01); *H02M 3/33592* (2013.01)

(58) Field of Classification Search
CPC .... H02J 7/0045; H02J 2207/20; H02J 3/1821; H02J 7/022; H02J 7/0019; H02M 3/33592; H02M 3/33576; H02M 1/0048; H01H 9/541

USPC .................. 320/107, 118, 122, 163; 700/298
See application file for complete search history.

(56) References Cited

U.S. PATENT DOCUMENTS

| | | | |
|---|---|---|---|
| 2007/0279790 A1 | 12/2007 | Tanner | |
| 2014/0107856 A1* | 4/2014 | Haynes | ................. G01F 23/284 700/298 |
| 2014/0266051 A1* | 9/2014 | Hayakawa | ............ H02J 7/0019 320/118 |

OTHER PUBLICATIONS

Buckley, Paul, "Dynamic-Bus-Voltage Architecture Aims to Reduce Power Consumption in Datacenters"; https://www.eenewseurope.com/news/dynamic-bus-voltage-architecture-aims-reduce-power-consumption-datacenters; Oct. 25, 2012; 60 pages, 3 pages.

* cited by examiner

*Primary Examiner* — Edward Tso
*Assistant Examiner* — Aaron Piggush
(74) *Attorney, Agent, or Firm* — Dickinson Wright PLLC; Mark E. Scott

(57) ABSTRACT

Multi-port power adapters. At least one example is a method including: supplying a first bus voltage to a first device by way of a DC-DC converter coupled to a link voltage; supplying a second bus voltage to a second device by way of a second DC-DC converter coupled to the link voltage; converting an AC voltage to the link voltage by way of an AC-DC converter; selecting, by a shunt regulator, a setpoint for the link voltage based on the first bus voltage and the second bus voltage; and regulating the link voltage to the setpoint by the AC-DC converter.

7 Claims, 6 Drawing Sheets

POWER ADAPTERS WITH MULTIPLE CHARGING PORTS

CROSS-REFERENCE TO RELATED APPLICATIONS

Not Applicable.

BACKGROUND

Portable electronic devices have internal batteries that periodically need to be recharged. In many cases, each portable electronic device comes with a power adapter designed and constructed to modify alternating current (AC) power available on wall sockets (e.g., 120V, 230V), to a suitable direct current (DC) charging voltage. For portable devices that charge by way of a Universal Serial Bus (USB) architecture, the portable electronic device may communicate with the power adapter to select a charging voltage based on the state of the portable electronic device. In the example USB architecture, the charging voltage may be selectable in a range from 3.3 Volts to 20 Volts or more.

BRIEF DESCRIPTION OF THE DRAWINGS

For a detailed description of example embodiments, reference will now be made to the accompanying drawings in which.

DEFINITIONS

Figure 1:
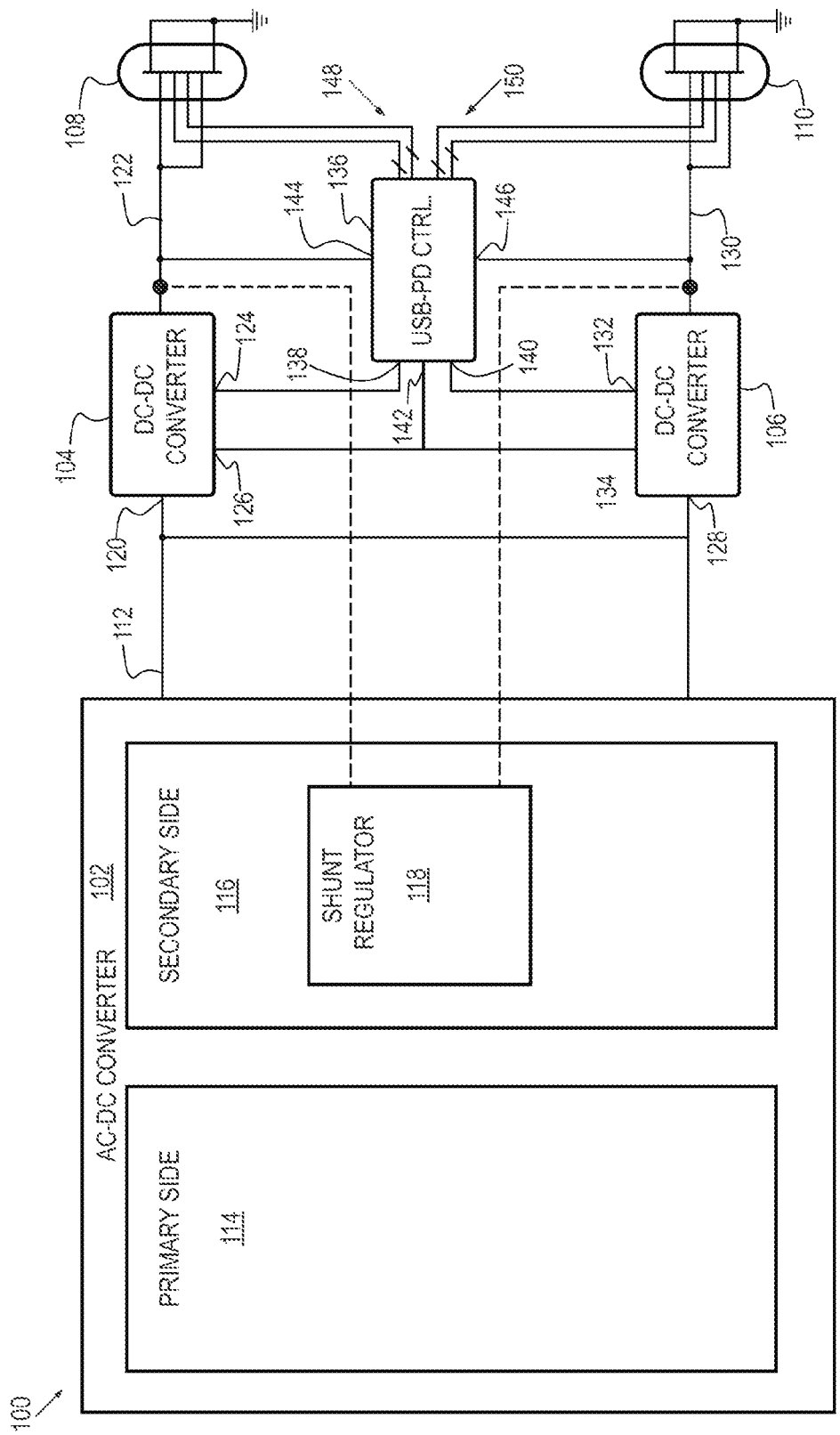
FIG. 1 shows a block diagram of a power adapter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"AC" shall mean alternating current as that term is understood in electrical engineering.

"DC" shall mean direct current as that term is understood in electrical engineering.

The terms "input" and "output" when used as nouns refer to connections (e.g., electrical, software), and shall not be read as verbs requiring action. For example, an operational amplifier may define a non-inverting input, an inverting input, and a driven output. The example operational amplifier may drive a signal on the driven output responsive to the state of the signals applied to the non-inverting input and the inverting input. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"About" shall mean the recited value plus or minus five percent (+/−5%) of the recited value.

"Controller" shall mean, alone or in combination, individual circuit components, an application specific integrated circuit (ASIC), a microcontroller with controlling software, a digital signal processor (DSP), a processor with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to power adapters with multiple charging ports. More particularly, various example embodiments are directed to power adapters (sometimes referred to as travel adapters) that have multiple charging ports that simultaneously charge multiple portable electronic devices. More particularly still, example embodiments are directed to power adapters with multiple charging ports (e.g., two or four) where each charging port may provide power different than other charging port(s), and where the power adapter may select an internal DC link voltage taking into account efficiency. More particularly still, at least some example embodiments are directed to shunt regulators that select a link voltage for a DC link within the power adapter taking into account voltages and/or currents provided by the various charging ports. The specification first turns to an overall system to orient the reader.

FIG. 1 shows a block diagram of an example power adapter. In particular, FIG. 1 shows an example power adapter 100 comprising an AC-DC converter 102, a DC-DC converter 104, a DC-DC converter 106, a first charging port 108, and a second charging port 110. The example AC-DC converter 102 is designed and constructed to couple to AC power, such as may be available in a wall socket. The AC power from the wall socket may be fed to a rectifier (not shown), such as a half-bridge rectifier or a full-bridge rectifier, to create a DC supply voltage having a magnitude about the same as the peak voltage of the AC power. The AC-DC converter 102 lowers the magnitude of the DC supply voltage to create a link voltage on the DC link 112.

In example cases, the link voltage is controllable or selectable in a range of voltages (e.g., 3.3V to 20V) to implement a strategy of increasing the efficiency of the power adapter 100 taking into account parameters such as the efficiency of the AC-DC converter 102, the number of devices being charged by way of the charging ports 108 and 110, and the bus voltages on the charging ports 108 and 110 (all discussed more below).

In example cases, the AC-DC converter 102 is a flyback power converter comprising a primary side 114 and a secondary side 116. In the example case of a flyback power converter, the primary side 114 and secondary side 116 are separated or delineated by a transformer (not specifically shown), with a primary winding within the primary side 114 and a secondary winding within the secondary side 116. However, other types of converters may be used as part of the AC-DC converter 102, and thus the description that follows based on a flyback power converter shall not be considered a limitation.

The example secondary side 116 comprises a shunt regulator 118. The shunt regulator 118 is designed and constructed to sense a bus voltage of a charging bus associated with the charging port 108, and also to sense a bus voltage of a charging bus associated with the charging port 110. There are several variations regarding sensing the bus voltages, and those variations are discussed more below. For now, however, FIG. 1 shows the shunt regulator 118 coupled to the charging buses of the charging ports 108 and 110 by way of dashed lines. The shunt regulator 118 is electrically coupled within a feedback path (discussed more below) from the secondary side 116 to the primary side 114, the feedback path provided such that primary side 114 can regulate the link voltage supplied on the DC link 112. The example shunt regulator 118 selects a setpoint for the link voltage of the DC link 112, and to which setpoint the primary side 114 controls. In particular, by creating a signal indicative of a setpoint voltage within the feedback path, the example shunt regulator 118 selects the setpoint for the link voltage of the DC link 112.

Still referring to FIG. 1. The example DC-DC converter 104 defines a link input 120 coupled to the DC link 112, a charging bus 122 coupled to the charging port 108, an enable input 124, and a communicational channel 126. The DC-DC converter 104 changes the voltage on the DC link 112 to a voltage selected by a portable electronic device (not shown) coupled to the charging port 108. In some cases, the DC-DC converter 104 is a buck-boost converter, meaning that the DC-DC converter 104 can raise or increase the link voltage supplied to the link input 120 and apply the increased voltage to the charging bus 122, or lower or decrease the voltage supplied on the link input 120 and apply the decreased voltage to the charging bus 122, as needed. In other cases, the DC-DC converter 104 may be buck-only converter.

The example DC-DC converter 106 defines a link input 128 coupled to the DC link 112, a charging bus 130 coupled to the charging port 110, an enable input 132, and a communicational channel 134. The DC-DC converter 106 changes the voltage on the DC link 112 to a voltage selected by a portable electronic device (not shown) coupled to the charging port 110. In some cases, the DC-DC converter 106 is a buck-boost converter, and in other cases, the DC-DC converter 106 may be buck-only converter.

The example power adapter 100 further comprises bus controller 136. In example cases, the charging ports 108 and 110 are operated under the USB power delivery (PD) specification. The bus controller 136 is labeled as USB-PD controller in the figure, and hereafter is referred to as the USB-PD controller 136, though other types of busses may be implemented. The example USB-PD controller 136 defines an enable output 138 coupled to the enable input 124 of the DC-DC converter 104, an enable output 140 coupled to the enable input 132 of the DC-DC converter 106, a communication channel 142 coupled to the communication channels 126 and 134, a sense input 144 coupled to the charging bus 122, a sense input 146 coupled to the charging bus 130, a plurality of data lines 148 coupled to the charging port 108, and a plurality of data lines 150 coupled to the charging port 110.

Consider, for purposes of explanation, that the AC-DC converter 102 is operational and producing a link voltage on the DC link 112, and that no portable electronic devices are coupled to the charging ports 108 and 110. In such a situation, the USB-PD controller 136 may de-assert both the enable output 138 and enable output 140 such that both DC-DC converters 104 and 106 are disabled and no voltages are provided to the charging buses 122 and 130.

Now consider that a portable electronic device is coupled to the charging port 108. When a portable electronic device is coupled to the charging port 108, the USB-PD controller 136 and the portable electronic device communicate over the plurality of data lines 148 to establish a charging voltage, which for the USB-PD specification may range from 3.3V to 20V. Once a charging voltage is established, the USB-PD controller 136 communicates a required bus voltage to the DC-DC converter 104 by way of the communication channels 142 and 126, and enables the DC-DC converter 104 by asserting the enable output 138. The DC-DC converter 104, in turn, supplies the selected bus voltage to the charging bus 122 to charge the portable electronic device coupled to the charging port 108.

Now consider that another portable electronic device is coupled to the charging port 110. As before, when a portable electronic device is coupled to the charging port 110, the USB-PD controller 136 and the portable electronic device communicate over the plurality of data lines 150 to establish a charging voltage. Once a charging voltage is established, the USB-PD controller 136 communicates a required bus voltage to the DC-DC converter 106 by way of the communication channels 142 and 134, and enables the DC-DC converter 106 by asserting the enable output 140. The DC-DC converter 106, in turn, supplies the selected bus voltage to the charging bus 130 to charge the portable electronic device coupled to the charging port 110.

As alluded to above, there could be a wide range of bus voltages applied to the charging buses 122 and 130 (and possibly others). In the example case of systems operated under the USB-PD specification, the low end of the voltage range may be 3.3V, while the high end of the voltage range may be 20V or more. Various example systems and methods are directed to selecting and implementing a link voltage for the DC link 112 that provides increased efficiency. In some cases, the selection of the link voltage may consider the efficiency of conversion of the DC-DC converters 104 and 106 without regard to the efficiency of conversion of the AC-DC converter 102. In other cases, the selection of the link voltage may consider both the efficiency of the AC-DC converter 102 and the DC-DC converters 104 and 106. That is, a link voltage may be selected that provides less than peak performance for the one or both of the DC-DC converters 104 and 106, but taking into account the efficiency of the AC-DC conversion process the link voltage selected may provide better overall efficiency for the power adapter 100. In example systems, the shunt regulator 118 selects a setpoint for the link voltage of the DC link 112 based on the bus voltage of the charging bus 122 and the bus voltage of the charging bus 130. With a setpoint for link voltage of the DC link 112 selected, the AC-DC converter 102 then regulates the link voltage to the setpoint while the DC-DC converters supply their respective bus voltages on their respective charging buses.

Before proceeding it is noted that the power adapter 100 of FIG. 1 comprises two charging ports 108 and 110. However, a power adapter having two charging ports is merely an example, and the various embodiments of selecting a setpoint for the link voltage of the DC link 112 may be extended to any power adapter having two or more charging ports (e.g., three, four, five, six, or eight). The specification now turns to an example system in greater detail.

Figure 2:
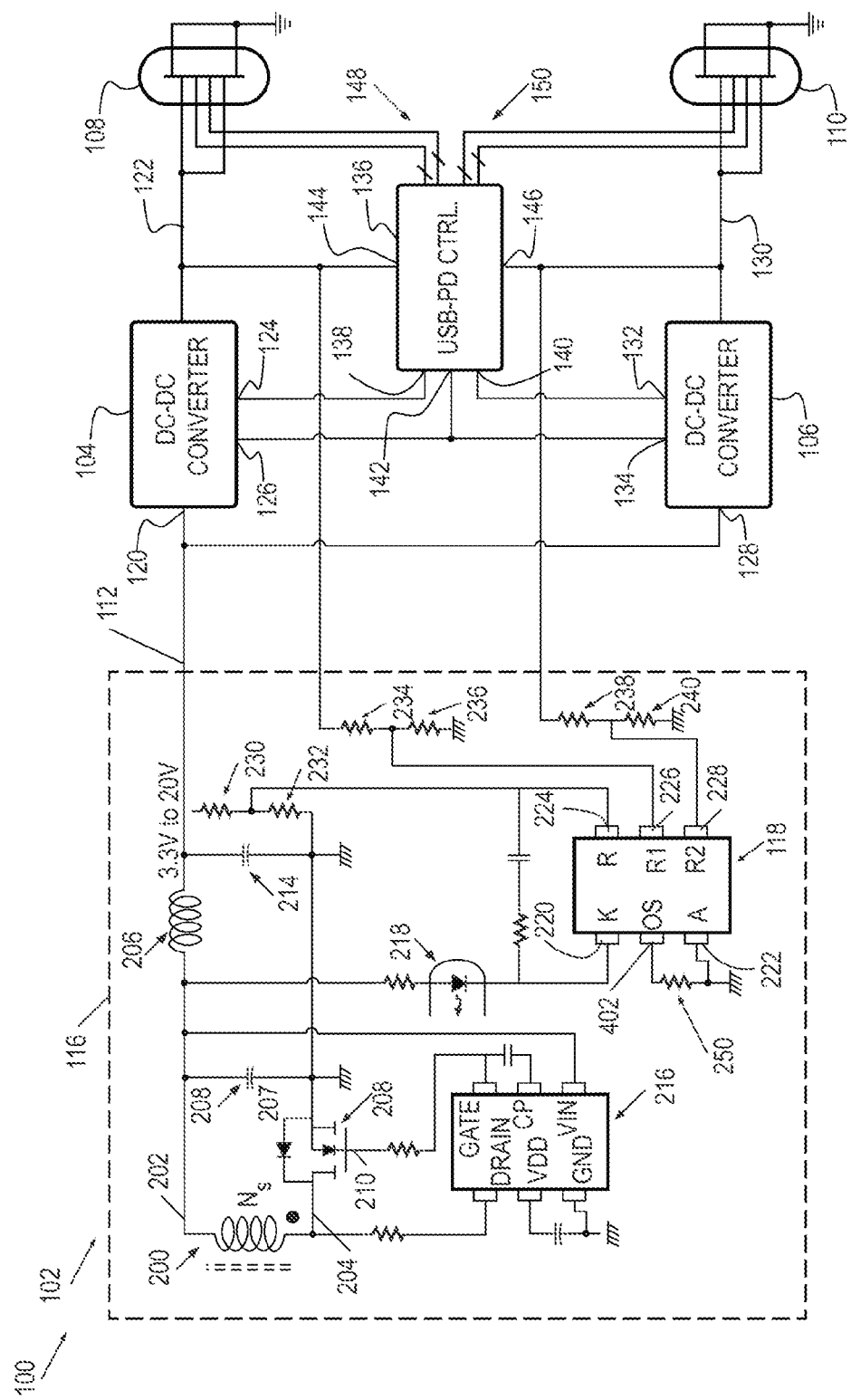
FIG. 2 shows a partial block diagram, partial electrical schematic, of a power adapter in accordance with at least some embodiments.

FIG. 2 shows a partial block diagram, partial electrical schematic, of an example power adapter 100. In particular, on the left side of FIG. 2 is an example secondary side 116, and with the primary side 114 omitted so as not to further complicate the figure. On the right side of FIG. 2 are the example DC-DC converters 104 and 106 and related components associated with the example charging ports 108 and 110. The various components on the right side of FIG. 2 are the same as in FIG. 1, carry the same reference numbers, and thus will not be introduced again so as not to unduly lengthen the description.

The example secondary side 116 includes the shunt regulator 118 and various additional components. In particular, the example secondary side 116 comprise a secondary winding 200 defining a first lead 202 and a second lead 204. The first lead 202 couples to a first lead of an inductor 206, and the second lead of the inductor 206 defines the DC link 112. The example secondary side 116 further comprises an electrically-controlled switch 208 operating as a synchronous rectifier. In the example of FIG. 2, the electrically-controlled switch 208 is shown as a field effect transistor (FET), and will hereafter be referred to as SR FET 208. The SR FET 208 defines a first connection or drain coupled to the second lead 204 of the secondary winding 200, a second connection or source coupled a return or common on the secondary side 116, and a control input or gate 210. An output capacitor 212 has first lead coupled to the first lead 202 of the secondary winding 200, and a second lead coupled to the common on the secondary side 116. Another output capacitor 214 has a first lead coupled to the DC link 112, and a second lead coupled to the common on the secondary side 116.

In order to control the SR FET 208, the example secondary side 116 comprises an SR controller 216 in the form of a packaged integrated circuit device. The example SR controller 216 defines a gate terminal coupled to the gate 210 of the SR FET 208, a drain terminal coupled to the drain of the SR FET 208, and various additional terminals to enable operation (e.g., an input voltage terminal coupled to the output capacitor 212, a ground terminal coupled to common on the secondary side 116).

In operation, the transformer, of which secondary winding 200 is a part, is operated as a flyback transformer. That is, during a charge mode a primary FET (not shown) on primary side 114 (FIG. 1) is made conductive. Current flows through the primary FET and a primary winding (not shown), storing energy in the field surrounding the transformer. During the charge mode, the voltage on the secondary winding 200 reverse biases the body diode 207 of the SR FET 208, the SR FET 208 is non-conductive, and thus no current flows. During the charge mode, current and voltage are supplied to the DC link 112 and downstream components by way of the output capacitors 212 and 214 and the field associated with current flow through the inductor 206.

Still referring to FIG. 2, when the charge mode ends the primary FET (not shown) on the primary side 114 (FIG. 1) is made non-conductive and the discharge mode begins. During the discharge mode, the voltage on the secondary winding 200 reverses, which forward biases the body diode 207 of the SR FET 208, and thus current begins to flow from the first lead 202 to the output capacitor 212 and other downstream components. The example SR controller 216 senses the current flow, and makes the SR FET 208 conductive to reduce conduction losses. As the field surrounding the transformer collapse, the secondary winding 200 provides voltage and current to the downstream components. In some case, the field around the transformer fully discharges before the next charge mode begins, and in other cases the secondary winding 200 may still be providing current when the next charge mode begins. Regardless, when SR controller 216 senses that the positive current flow through the secondary winding 200 has stopped, the SR controller 216 makes the SR FET 208 non-conductive, and the process starts anew.

In example systems, the energy transferred across the transformer, and thus the voltage developed and maintained on the DC link 112, is controlled by the primary side 114 (FIG. 1). For example, if the DC link 112 voltage droops below a setpoint (e.g., because of increased power drawn by portable electronic devices coupled to the charging ports), the AC-DC converter 102 increases the amount of energy transferred across the transformer in each charge-to-discharge mode transition to maintain the setpoint for the link voltage of the DC link. Increasing the energy transferred may include increasing the switching frequency on the primary side (e.g., increasing the frequency of the charge modes), increasing the pulse width of the signals applied to the primary FET (e.g., making each charge mode longer), or both. Oppositely, if the DC link 112 voltage rises above a setpoint (e.g., because of decreased power drawn by portable electronic devices coupled to the charging ports), the AC-DC converter 102 decreases the amount of energy transferred across the transformer to maintain the setpoint for the link voltage of the DC link. Decreasing the energy transferred may include decreasing the switching frequency on the primary side (e.g., decreasing the frequency of the charge modes), decreasing the pulse width of the signals applied the primary FET (e.g., making each charge mode shorter), or both.

In order for the primary side 114 (FIG. 1) to know the state of the voltage on the secondary side 116, the secondary side 116 implements a feedback path to the primary side 114. In the example system, and taking into account the galvanic isolation implemented by the transformer, the feedback path includes an opto-coupler. In particular, the example secondary side 116 comprises a light emitting diode (LED) 218 having an anode coupled to the upper lead of the output capacitor 212, and a cathode coupled to the common the secondary side 116 by way of the shunt regulator 118. Ignoring for a moment the shunt regulator 118, current flows through the LED 218 producing photons, with the rate of photon production directly proportional to the voltage on the output capacitor 212. The second half of the opto-coupler is on the primary side 114 and comprises a transistor with base optically coupled to (though electrically isolated from) the LED 218. The conductance of the transistor is based on the rate of photon production by the LED 218. It follows that a primary side controller (not shown) is provided a feedback signal (created by the transistor of the opto-coupler) based on the voltage on the secondary side 116. The primary-side controller will have an internal setpoint to which it controls; however, in accordance with example systems the setpoint for the link voltage of the DC link 112 is manipulated by current flow through the LED 218, the manipulation implemented by the shunt regulator 118.

Still referring to FIG. 2, the example shunt regulator 118 defines a cathode terminal 220 (labeled K), an anode terminal 222 (labeled A), a reference terminal 224 (labeled R), a first sense terminal 226 (labeled R1), and a second sense terminal 228 (labeled R2). In example cases, the shunt regulator 118 is a packaged semiconductor device, and an example set of internal components is discussed in greater detail below. The cathode terminal 220 is coupled to the cathode of the LED 218. The anode terminal 222 is coupled to the common on the secondary side 116. The reference terminal 224 is coupled to the DC link 112 by way of a voltage divider circuit comprising resistor 230 and resistor 232. In particular, resistors 230 and 232 are coupled in series between the DC link 112 and the common on the secondary side 116, and the reference terminal 224 is coupled to the node between the resistors 230 and 232. The sense terminal 226 is coupled to the charging bus 122 by way of a voltage divider circuit comprising resistor 234 and resistor 236. In particular, resistors 234 and 236 are coupled in series between the charging bus 122 and the common on the secondary side 116, and the sense terminal 226 is coupled to the node between the resistors 234 and 236. The sense terminal 228 is coupled to the charging bus 130 by way of a voltage divider circuit comprising resistor 238 and resistor 240. In particular, resistors 238 and 240 are coupled in series between the charging bus 130 and the common on the secondary side 116, and the sense terminal 228 is coupled to the node between the resistors 238 and 240.

In accordance with example embodiments, the shunt regulator 118 creates a signal indicative of a setpoint voltage across the cathode terminal 220 and the anode terminal 222. That is, the shunt regulator 118 is designed and constructed to control current flow into the cathode terminal 220, and out of the anode terminal 222, to control the voltage developed at the cathode terminal 220 with respect to the anode terminal 222 (e.g., common on the secondary side 116). Considered from the standpoint of current flow, by controlling or limiting current flow through the shunt regulator 118, the shunt regulator 118 controls current flow through the LED 218 and thus controls the rate of photon production. Considered from the standpoint of voltage developed across the cathode terminal 220 and the anode terminal 222, by controlling the voltage across the cathode terminal 220 and the anode terminal 222 the shunt regulator 118 controls the rate of photon production by the LED 218. Because the shunt regulator 118 is disposed within the feedback path to the primary side 114 (FIG. 1), the signal indicative of setpoint voltage across the cathode terminal 220 and the anode terminal 222 sets or controls the link voltage of the DC link 112.

Consider, for purposes of explanation, that the AC-DC converter 102 is operational and producing a link voltage on the DC link 112, and that no portable electronic devices are coupled to the charging ports 108 and 110. In such a situation, the USB-PD controller 136 may de-assert both the enable output 138 and the enable output 140 such that both DC-DC converters 104 and 106 are disabled and no voltages are provided to the charging buses 122 and 130. In such a situation, the voltage provided to the reference terminal 224 controls the setpoint for the link voltage of the DC link 112. In one example situation, the voltage created by the voltage divider comprising resistors 230 and 232 creates a reference voltage of about 2.5V on the reference terminal 224. The reference voltage of 2.5V results in a certain current flow through the shunt regulator 118 from the cathode terminal 220 to the anode terminal 222. Further consider that having 2.5V applied to the reference terminal 224 results in a link voltage on the DC link 112 of 20V. The example of the 2.5V reference voltage resulting in a link voltage of 20V is just that, an example. The system can be designed and constructed such that 2.5V results in different link voltages, and different link voltages may be implemented when none of the charging ports are charging portable electronic devices.

Now consider that a portable electronic device is coupled to the charging port 108, and that no portable electronic device is coupled to the charging port 110. As before, when a portable electronic device is coupled to the charging port 108, the USB-PD controller 136 and the portable electronic device communicate over the plurality of data lines 148 to establish a charging voltage, which for USB-PD may range from 3.3V to 20V. Once a charging voltage is established, the USB-PD controller 136 communicates a bus voltage to the DC-DC converter 104 by way of the communication channels 142 and 126, and enables the DC-DC converter 104 by asserting the enable output 138. The DC-DC converter 104, in turn, supplies the selected charging voltage to the charging bus 122 to charge the portable electronic device coupled to the charging port 108.

In this example situation where only one portable electronic device is coupled to the power adapter 100 by way of charging port 108, further consider that the bus voltage on the charging bus 122 is selected to be 3.3V. While possible for the DC-DC converter 104 to buck the link voltage at the link input 120 down to 3.3V, better efficiency may be achieved by the DC-DC converter 104 if the link voltage is closer to bus voltage of the example charging bus 122 (e.g., the link voltage reduced to 3.3V). In example situations the shunt regulator 118 senses, by way of the sense terminal 226, the bus voltage of the charging bus 122, and the shunt regulator 118 senses, by way of the sense terminal 228, the bus voltage of the charging bus 130. In the example situation of reducing the link voltage from 20V to 3.3V, and responsive to the changing internal reference voltage VREF, the current/voltage across the shunt regulator 118 is changed to increase the rate of photon production as a signal to decrease the amount of energy transferred from the primary side 114 to the secondary side 116.

In the example situation with a portable electronic device coupled the charging port 108 and no portable electronic device coupled to the charging port 110, if the portable electronic device and the USB-PD controller 136 negotiate a different charging voltage for the charging bus (e.g., 5V, 10V, 15V), the shunt regulator 118 may sense the selected bus voltage on the charging bus 122 and set the link voltage for the DC link 112 accordingly. In the situation where the bus voltage on the charging bus 122 is 20V, and the bus voltage for the charging bus 122 is selected to be 20V, the shunt regulator 118 may make no change to the link voltage for the DC link 112.

Still considering the example situation with a portable electronic device coupled to the charging port 108 and no portable electronic device coupled to the charging port 110. In the description to this point the shunt regulator 118 selected a setpoint for the link voltage considering only efficiency of the active DC-DC converter, in this case DC-DC converter 104. However, the AC-DC converter 102 likewise has operational states in which better efficiency may be achieved. Thus, there may be situations in which particular link voltages result in a loss of efficiency by the AC-DC converter 102 that is greater than a gain in efficiency of the DC-DC converter 104 a particular link voltage may provide. Thus, in yet still other examples, the shunt regulator 118 may select a setpoint for the link voltage that takes into account overall efficiency of the power adapter 100 (e.g., both the AC-DC converter 102 and the DC-DC converter 104).

An AC-DC converter 102 operated as a flyback power converter has lower efficiency at lower link voltages, and higher efficiency at higher link voltages, assuming the same power rating. Thus, the shunt regulator 118 may implement a lower boundary for link voltages such that the AC-DC converter 102 operates at better efficiency, and the DC-DC converter 104 operates at a lower efficiency, but where the overall efficiency of the power adapter 100 is better than if efficiency of the AC-DC converter 102 is not taken into account. For example, while an AC-DC converter 102 operated in the form of a flyback converter coupled to AC wall voltages (e.g., 120V, 230V) may be able to create a link voltage of 3.3V or 5V on the DC link 112, the overall efficiency of the power adapter 100 may be low. Thus, in example cases the shunt regulator 118 may be designed and constructed to implement a lower boundary of the link voltage for the DC link 112 higher than charging voltage of the charging bus 122. In particular, for an example AC-DC converter 102 implemented as a flyback power converter, the inventors of the specification have found that better overall efficiency may be achieved by implementing a link voltage of about 10V for the DC link 112 in spite of the fact the selected bus voltage for the charging bus 122 is below 10V (e.g., 3.3V or 5V).

Thus, as before the shunt regulator 118 senses, by way of the sense terminal 226, the bus voltage of the charging bus 122, and the shunt regulator 118 senses, by way of the sense terminal 228, the bus voltage of the charging bus 130. As before, the shunt regulator 118 creates a signal indicative of a setpoint voltage by changing the current flow through the cathode terminal 220 and anode terminal 222. However, in this case signal indicative of setpoint voltage implements a predetermined lower boundary for the link voltage for the DC link 112. In the example situation of a charging voltage for the charging bus 122 below 10V (e.g., 3.3V or 5V), and reducing the link voltage from 20V, the current/voltage across the shunt regulator 118 may be lowered to the lower boundary for the link voltage—in this example case about 10V.

Couple of points before proceeding. First, the "no charging" link voltage of 20V on the DC link 112 is merely an example. The "no charging" voltage may be any voltage selected by the circuit designer, and it follows that in certain situations the shunt regulator 118 may raise the link voltage of the DC link 112 responsive to a selected charging voltage for the charging bus 122. Moreover, a reference voltage of 2.5V resulting in a link voltage of 20V on the DC link 112 is also merely an example, and the relationship of the link voltage to the reference voltage may be selected by adjusting the voltage divider resistors 230 and 232 at the discretion of the circuit designer. The description of operation of the system in the example situation of a portable electronic device coupled to the charging port 108 and no portable electronic device coupled to the charging port 110 is equally applicable to the reverse situation—no portable electronic device coupled to charging port 108 and a portable electronic device coupled to the charging port 110—and thus a description of the reverse situation will not be presented so as not to unduly lengthen the specification. Finally, the lower boundary of the link voltage of about 10V for the DC link 112 is a specific example for the case of a specific flyback power converter. Other flyback converters, and other AC-DC converters generally (e.g., a forwarding converter, or resonant-primary (LLC) converter) may have different efficiency considerations, and thus different lower boundary link voltages for the DC link 112 are possible, including cases where no lower boundary is implemented.

Now consider that a portable electronic device is coupled to the charging port 108 and another portable electronic device is coupled to the charging port 110. As before, when a portable electronic device is coupled to the charging port 108, the USB-PD controller 136 and the portable electronic device communicate over the plurality of data lines 148 to establish a charging voltage. Once a charging voltage is established, the USB-PD controller 136 communicates a bus voltage to the DC-DC converter 106 by way of the communication channels 142 and 126, and enables the DC-DC converter 104 by asserting the enable output 138. The DC-DC converter 104, in turn, supplies the selected bus voltage to the charging bus 122 to charge the portable electronic device coupled to the charging port 108. Moreover, when a portable electronic device is coupled to the charging port 110, the USB-PD controller 136 and the portable electronic device communicate over the plurality of data lines 150 to establish a charging voltage. Once a charging voltage is established, the USB-PD controller 136 communicates a bus voltage to the DC-DC converter 106 by way of the communication channels 142 and 134, and enables the DC-DC converter 106 by asserting the enable output 140. The DC-DC converter 106, in turn, supplies the selected bus voltage to the charging bus 130 to charge the portable electronic device coupled to the charging port 110.

The shunt regulator 118 senses, by way of the sense terminal 226, the bus voltage of the charging bus 122, and the shunt regulator 118 senses, by way of the sense terminal 228, the bus voltage of the charging bus 130. As before, the shunt regulator 118 creates a signal indicative of a setpoint voltage by changing the current flow through the cathode terminal 220 and anode terminal 222. However, in the situation in which two (or more) charging ports are charging portable electronic devices, there may be a large range of bus voltages on the charging buses. For example, one charging bus may implement a bus voltage on the low end of the voltage range (e.g., 3.3V), while another charging bus may implement a bus voltage on the high end of the voltage range (e.g., 20V). There are several variations regarding how the shunt regulator 118 may select a setpoint for the link voltage of the DC link 112 when differing bus voltage on the charging buses are used, and each variation is discussed below.

In one example case, the shunt regulator 118 may be designed and constructed to select a setpoint for the link voltage that is about the same as the higher of the bus voltages. In the example case of one selected bus voltage of 3.3V on a charging bus and another selected bus voltage of 20V on a charging bus, the shunt regulator 118 may select the setpoint link voltage to be 20V. Selecting the setpoint for the link voltage that is the same as the higher than the highest bus voltage may be used in situations in which the DC-DC converters 104 and 106 are both buck-only converters, but such an implementation is not limited to situations of buck-only converters.

In another example case, the shunt regulator 118 may be designed and constructed to select a setpoint for the link voltage that is between the bus voltages of the charging buses (e.g., average of the bus voltages). In the example case of one selected bus voltage of 3.3V and another selected bus voltage of 20V, the shunt regulator 118 may select the setpoint link voltage to be 11.65V (e.g., the average value). Selecting the setpoint for the link voltage that is between the bus voltages of the charging buses may be used in situations in which the DC-DC converters 104 and 106 are both buck-boost converters.

In another example case, the shunt regulator 118 may be designed and constructed to select a setpoint for the link voltage that is about the same as the lower of the bus voltages. In the example case of one selected bus voltage of 3.3V and another selected bus voltage of 20V, the shunt regulator 118 may select the setpoint link voltage to be 3.3V. Selecting the setpoint for the link voltage that is between the charging voltages may be used in situations in which the DC-DC converters 104 and 106 are both buck-boost converters.

In another example case, the shunt regulator 118 may be designed and constructed to select a setpoint for the link voltage that is higher than both charging voltages. In the example case of one selected bus voltage of 3.3V and another selected bus voltage of 20V, the shunt regulator 118 may select the setpoint link voltage to be 21V or more. Selecting the setpoint for the link voltage that is between the charging voltages may be used in situations in which the DC-DC converters 104 and 106 are both buck-only converters, but such an implementation is not limited to situations of buck-only converters.

In another example case, the shunt regulator 118 may be designed and constructed to select a setpoint for the link voltage based on a predetermined mathematical relationship that results in better efficiency taking into consideration the bus voltages of each charging bus, and the efficiency of each of the DC-DC converter 104 and 106.

In another example case, the shunt regulator 118 may be designed and constructed to select a setpoint for the link voltage according to any of the previous examples, but also implementing the lower boundary of the link voltage that takes into account efficiency of the AC-DC converter 102. In the example case of one selected bus voltage of 3.3V, another selected bus voltage of 20V, and the lower boundary of the link voltage being 10V, the shunt regulator 118 may select the setpoint link voltage to be 10V (i.e., the lower boundary), 11.65V (e.g., the average value), 20V, or above 20V, all at the discretion of the circuit designer.

In the examples discussed with respect to FIG. 2, the shunt regulator 118 senses the charging voltages in an analog sense. That is, the shunt regulator 118 senses a signal indicative of the bus voltage of the charging bus 122, and senses a signal indicative of the bus voltage of the charging bus 130, and selects the setpoint for the link voltage based on the signals. However, in other embodiments the sensing of the bus voltage of the charging buses may take place in other ways.

Figure 3:
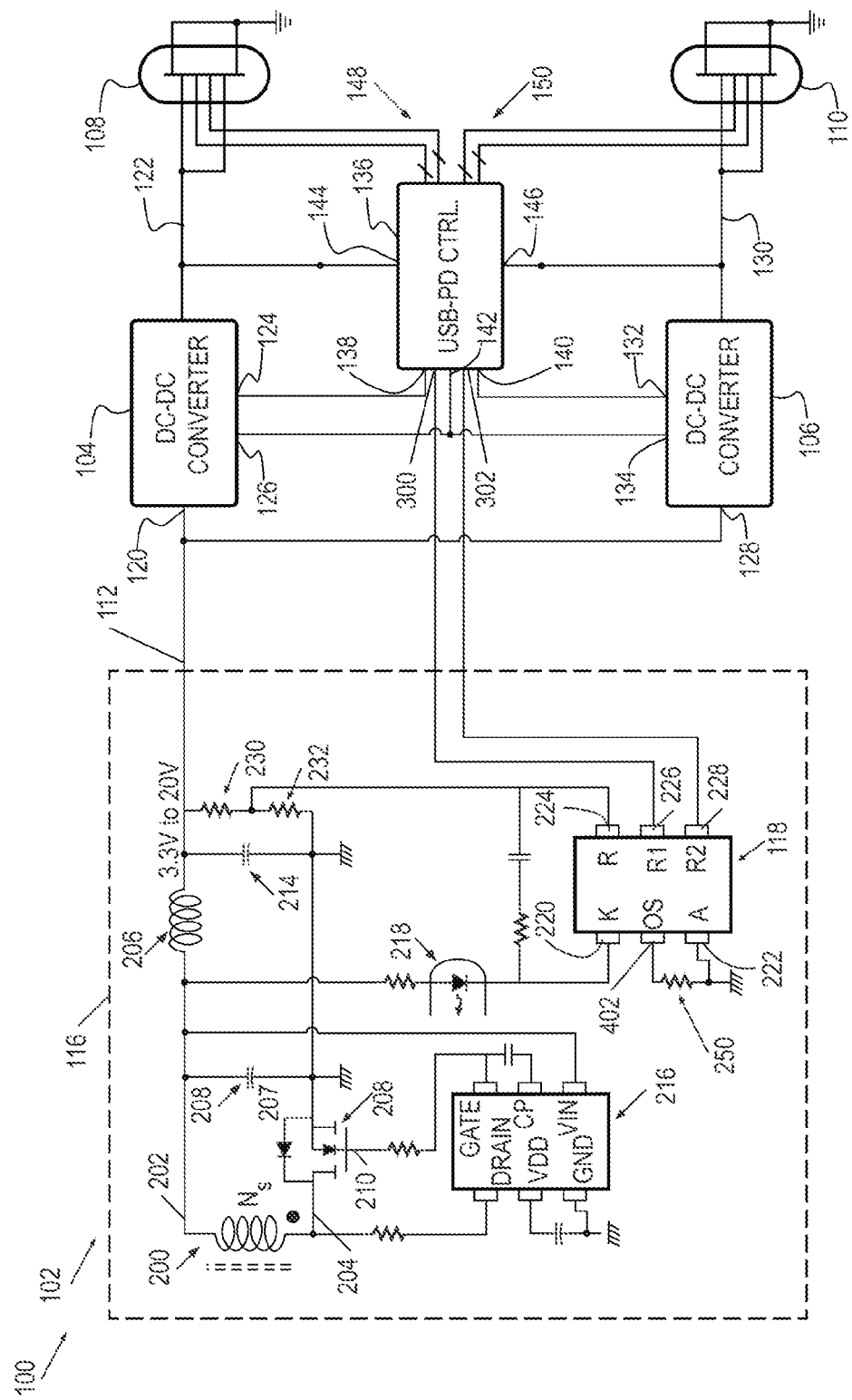
FIG. 3 shows a partial block diagram, partial electrical schematic, of a power adapter in accordance with at least some embodiments.

FIG. 3 shows a partial block diagram, partial electrical schematic, of an example power adapter. In particular, on the left side of FIG. 3 is the example secondary side 116, and on the right side of FIG. 3 are the example DC-DC converters 104 and 106 and related components associated with the example charging ports 108 and 110. Many of the components of FIG. 3 are the same as FIG. 2, and carry the same reference numbers, and thus will not be introduced again so as not to unduly lengthen the description. In FIG. 3, however, the shunt regulator 118, though possibly the same shunt regulator 118 of FIG. 2, senses the charging voltages differently than in FIG. 2. Moreover, the USB-PD controller 136, though possibly the same USB-PD controller 136 of FIG. 2, directly communicates with the shunt regulator 118. Operation of these two devices will be addressed in turn, starting with the USB-PD controller 136.

The example USB-PD controller 136 further comprises additional communication channels 300 and 302. The example communication channel 300 is coupled to the sense terminal 226. The example communication channel 302 is coupled to the sense terminal 228. In one example, the communication channels 300 and 302 are distinct communication channels. In another example, however, the communication channels 300 and 302 implement two conduction pathways of a serial communication channel (e.g., the SCL and SDA lines of an Inter-Integrated Circuit ($I^2C$) serial communication bus). Further, while the communication channel 142 is shown as separate from the communication channels 300 and 302, in yet still further case a single serial communication bus may be coupled to and communicate among the USB-PD controller 136, the DC-DC converters 104 and 106, and the shunt regulator 118.

In examples in which the shunt regulator 118 is communicatively coupled to the USB-PD controller 136, the shunt regulator 118 may sense the bus voltages of the charging buses 122 and 130 through communication with the USB-PD controller 136. In particular, in example cases the shunt regulator 118 may receive a value (e.g. a digital value) indicative of the bus voltage of the charging bus 122 by way of the communication channels 300 and 302. Further, the shunt regulator 118 may receive a value (e.g. a digital value) indicative of the bus voltage of the charging bus 130 by way of the communication channels 300 and 302. Using the values, the shunt regulator 118 may select and implement a setpoint for the link voltage of the DC link 112 as discussed above. In another example case, a setpoint for the link voltage of the DC link 112 is determined in the USB-PD controller 136 and the determined setpoint is directly communicated from the USB-PD controller 136 to the shunt regulator 118 through the communication channels 300 and 302. Moreover, the magnitude of the selected setpoint for the link voltage of the DC link 112 may be consistent with any of the examples above (e.g., link voltage equals highest bus voltage, link voltage equals lowest bus voltage, link voltage equals average of the bus voltages, link voltage higher than highest bus voltage, and variants that implement the lower boundary link voltage).

The example power adapter 100 of FIG. 3 may also implement additional cases based on additional information provided from the USB-PD controller 136. In particular, in addition to receiving values indicative of the bus voltage for each charging bus, the USB-PD controller 136 may send, and the shunt regulator 118 may receive, values indicative of an amount of power provided to the portable electronic device coupled to each respective charging port. For example, the USB-PD controller 136 may send values indicative of the current being provided to each charging port. Using the additional information regarding power, the shunt regulator 118 may select a setpoint link voltage for the DC link 112 that takes into account values indicative of power provided, where the setpoint for the link voltage may be different than selections that take into account only bus voltage of each charging bus.

In one example case, the shunt regulator 118 may be designed and constructed to select a setpoint for the link voltage that is about the same as the charging voltage being provided by the charging port providing the most power. Consider, as an example, one selected bus voltage of 3.3V providing 3A (i.e., 9.9 Watts), and another selected bus voltage of 20V providing 0.1A (i.e., 2 Watts). The example shunt regulator 118 may select the setpoint link voltage to be 3.3V to be the same as the charging port providing more power. That is, better overall efficiency may be achieved by improving the efficiency of the highest loaded DC-DC converter. Consider, as another example, one selected bus voltage of 3.3V providing 0.1A (i.e., 0.33 Watts), and another selected bus voltage of 20V providing 1A (i.e., 20 Watts). The example shunt regulator 118 may select the setpoint link voltage to be 20V to be the same as the charging port providing more power.

In another example case, the shunt regulator 118 may be designed and constructed to select a setpoint for the link voltage that is higher than the bus voltage providing the most power, yet still possibly below the highest bus voltage. Consider, as an example, one selected charging voltage of 3.3V providing 3A (i.e., 9.9 Watts), and another selected charging voltage of 20V providing 0.1A (i.e., 2 Watts). The example shunt regulator 118 may select the setpoint link voltage to be 5.0V to be higher than the bus voltage of the charging port providing more power, but still less than the highest charging voltage. Consider, as another example, one selected bus voltage of 3.3V providing 1A (i.e., 3.3 Watts), and another selected charging voltage of 20V providing 2A (i.e., 40 Watts). The example shunt regulator 118 may select the setpoint link voltage to be higher than 20V.

In another example case, the shunt regulator 118 may be designed and constructed to select a setpoint for the link voltage based on mathematical relationship that results in better efficiency taking into consideration the bus voltages, power provided by each charging bus, and the efficiency of each DC-DC converter 104 and 106.

In another example case, the shunt regulator 118 may be designed and constructed to select a setpoint for the link voltage according to any of the previous examples, but also implementing the lower boundary of the link voltage that takes into account efficiency of the AC-DC converter 102. In the example case of one selected charging voltage of 3.3V at 3A, another selected charging voltage of 20V at 0.1A, and the lower boundary of the link voltage being 10V, the shunt regulator 118 may select the setpoint link voltage to be 10V (i.e., the lower boundary) or higher.

Figure 4:
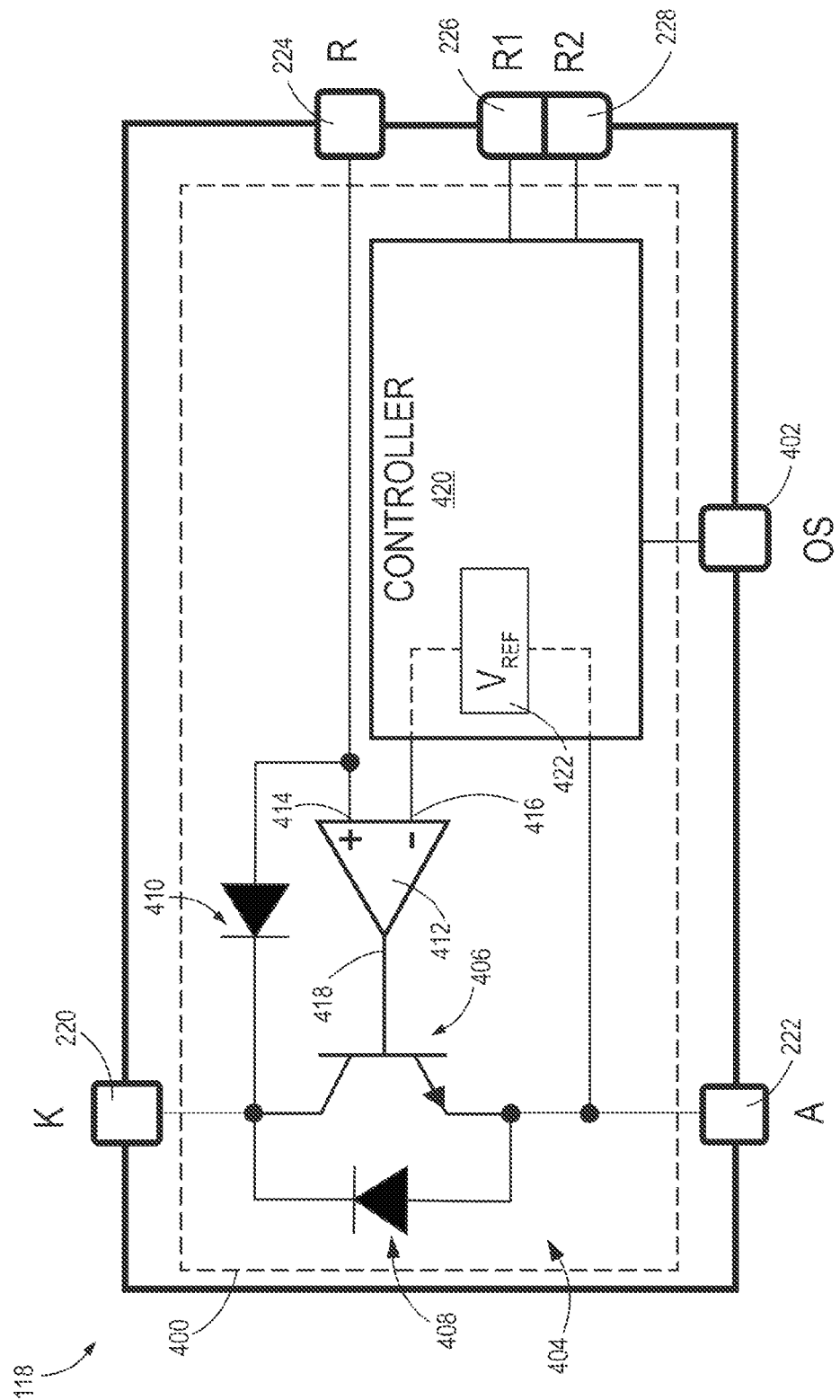
FIG. 4 shows a partial schematic, partial block diagram, of a shunt regulator in accordance with at least some embodiment.

FIG. 4 shows a partial schematic, partial block diagram, of an example shunt regulator 118. In particular, FIG. 4 shows that the shunt regulator 118 may comprise one or more substrates of semiconductor material (e.g., silicon), such as substrate 400, encapsulated within packaging to create a packaged semiconductor product. Bond pads or other connection points of the substrate 400 couple to terminals of the shunt regulator 118 (e.g., cathode terminal 220, anode terminal 222, etc.). While a single substrate 400 is shown, in other cases multiple substrates may be combined to form the shunt regulator 118 (e.g., a multi-chip module). The example shunt regulator 118 has all the previous terminals introduced, and further including an offset terminal 402 (labeled OS). The purpose of the offset terminal 402 is discussed in greater detail below.

Internally, the example shunt regulator 118 comprises a semiconductor circuit 404. In example cases, the semiconductor circuit 404 is coupled between the cathode terminal 220 and the anode terminal 222 and operates as a controllable Zener diode with its anode coupled to the anode terminal 222, and its cathode coupled to the cathode terminal 220—hence the naming convention. In many cases, the functionality is implemented by transistors, diodes, and an operational amplifier, not an actual Zener diode. In particular, the example semiconductor circuit 404 includes transistor 406. The example transistor 406 is shown as an NPN-type junction transistor, but other junction transistor types, and other types of transistors (e.g. FETs) may be used. The example transistor 406 defines a first connection or collector coupled to the cathode terminal 220, a second connection or emitter coupled to the anode terminal 222, and a base. The semiconductor circuit 404 further includes a diode 408 having an anode coupled to the anode terminal 222 and a cathode coupled to the cathode terminal 220. Another diode 410 defines a cathode coupled to the cathode terminal 220 and an anode.

The example semiconductor circuit 404 further comprises an operational amplifier 412 defining a non-inverting input 414 coupled to the anode of the diode 410, an inverting input 416, and a control output 418 coupled to the base of the transistor 406. The non-inverting input 414 is also coupled to the reference terminal 224.

The example shunt regulator 118 further defines the controller 420. The controller 420 is coupled to the first sense terminal 226, the second sense terminal 228, and the offset terminal 402. In example systems, the controller 420 is designed and constructed to: sense, by way of first sense terminal 226, the first bus voltage supplied to the first charging port; and sense, by way of the second sense terminal 228, the second bus voltage supplied to a second charging port. The example controller 420 creates a signal indicative of a setpoint voltage across the cathode terminal 220 and anode terminal 222, the creation by selecting an internal reference voltage VREF 422 driven to the inverting input 416 of the operational amplifier 412 referenced to the anode terminal 222. The internal reference voltage VREF 422 is selected based on the first bus voltage and the second bus voltage as discussed above.

Still referring to FIG. 4, in example cases in which the shunt regulator 118 senses the bus voltages in analog form, the controller 420 is designed and constructed to: sense, by way of the sense terminal 226, an analog signal indicative of the first bus voltage; and sense, by way of the sense terminal 228, an analog signal indicative of the second bus voltage. If additional charging ports are implemented, the shunt regulator 118 may include additional sense terminals. Based on the analog signals received on the example sense terminals 226 and 228, the controller 420 generates the internal reference voltage VREF 422. Stated slightly differently, the controller 420 creates the signal indicative of the setpoint voltage across the cathode terminal 220 and anode terminal 222, in all the example variants above, by selecting and generating the internal reference voltage VREF 422.

Referring simultaneously to FIGS. 2 and 4. Consider, as an example, that the node between the voltage divider comprising resistors 230 and 232 creates a voltage ratio of 10:1 (voltage on the reference terminal 224 is one-tenth of the link voltage of the DC link 112). Further consider that the node between the voltage divider comprising resistors 234 and 236 creates a voltage ratio of 10:1 (voltage on the sense terminal 226 is one-tenth of the bus voltage of the charging bus 122). Further consider that the node between the voltage divider comprising resistors 238 and 240 creates a voltage ratio of 10:1 (voltage on the sense terminal 228 is one-tenth of the bus voltage of the charging bus 130). Further consider that the voltage on the sense terminal 226 is 1.5V (which means the bus voltage of the charging bus 122 is 15V in the example), and the voltage on the sense terminal 228 is 0.5V (which means bus voltage on the charging bus 130 is 5V in the example). In example systems in which the link voltage of the DC link 112 is selected to be the higher of the bus voltages of the charging buses, the controller 420 generates the internal reference voltage VREF 422 to be 1.5V, resulting in the link voltage of the DC link 112 of 15V. In example systems in which the link voltage of the DC link 112 is selected to be the lower of the bus voltages of the charging buses, the controller 420 generates the internal reference voltage VREF 422 to be 0.5V, resulting in the link voltage of the DC link 112 of 5V. As yet another example, in example systems in which the link voltage of the DC link 112 is selected to be between the bus voltages of the charging buses (e.g., the average), the controller 420 generates the internal reference voltage VREF 422 to be 1.0V, resulting in the link voltage of the DC link 112 of 10V.

Returning to FIG. 4, in example cases in which the shunt regulator 118 receives voltages in digital form from the USB-PD controller 136, the controller 420 is designed and constructed to: receive a value indicative of the first bus voltage (and possibly a value indicative of a first bus power) by way of a communication channel associated with the sense terminal 226; and receive a value indicative of the second bus voltage (and possibly a value indicative of a second bus power) by way of a communication channel associated with the sense terminal 228. As discussed above, the communication channels may be dedicated channels, or the sense terminals 226 and 228 together may form a shared communication channel in the example form of a serial communication channel (e.g., $I^2C$). Based on the values received on the sense terminals 226 and 228, the controller 420 generates the internal reference voltage VREF 422. Stated slightly differently, the controller 420 creates the signal indicative of the setpoint voltage across the cathode terminal 220 and anode terminal 222, in all the example variants above (including, additionally, a possible selection based on power provided), by selecting and generating the internal reference voltage VREF 422.

Referring simultaneously to FIGS. 3 and 4. Consider again that the node between the voltage divider comprising resistors 230 and 232 creates a voltage ratio of 10:1 (voltage on the reference terminal 224 is one-tenth of the link voltage of the DC link 112). Further consider that the controller 420 receives a value indicating the bus voltage of the charging bus 122 is 15V, and a value indicating the bus voltage on the charging bus 130 is 5V. In example systems in which the link voltage of the DC link 112 is selected to be the higher of the bus voltages of the charging buses, the controller 420 generates the internal reference voltage VREF 422 to be 1.5V, resulting in the link voltage of the DC link 112 of 15V. In example systems in which the link voltage of the DC link 112 is selected to be the lower of the bus voltages of the charging buses, the controller 420 generates the internal reference voltage VREF 422 to be 0.5V, resulting in the link voltage of the DC link 112 of 5V. As yet another example, in example systems in which the link voltage of the DC link 112 is selected to be between the bus voltages of the charging buses (e.g., the average), the controller 420 generates the internal reference voltage VREF 422 to be 1.0V, resulting in the link voltage of the DC link 112 of 10V.

Still referring simultaneously to FIGS. 3 and 4. Consider again that the node between the voltage divider comprising resistors 230 and 232 creates a voltage ratio of 10:1 (voltage on the reference terminal 224 is one-tenth of the link voltage of the DC link 112). Further consider that the controller 420: receives a value indicating the bus voltage of the charging bus 122 is 15 V, and receives a value indicating the bus current on the charging bus 122 is 0.1A; and receives a value indicating the bus voltage on the charging bus 130 is 5 V, and receives a value indicating the bus current on the charging bus 130 is 3A. In example systems in which the link voltage of the DC link 112 is selected to be about the same or higher than the charging bus delivery higher power, the controller 420 generates the internal reference voltage VREF 422 to be about 0.5V, resulting in the link voltage of the DC link 112 of 5V.

Returning to FIG. 4. In some example shunt regulators the sense terminal 226 and sense terminal 228 perform dual functions. That is, if the shunt regulator 118 is placed in a power adapter 100 (FIG. 1) in which the bus voltages of the charging buses are read in analog form (e.g., FIG. 2), then the controller 420 is designed and constructed to sense the bus voltages in analog form. However, if the shunt regulator 118 is placed in a power adapter 100 (FIG. 1) in which the bus voltages of the charging buses are read or received in digital form (e.g., FIG. 3), then the controller 420 is designed and constructed to sense the serial communication across the sense terminals 226 and 228 (e.g., sense the header packets at a clock frequency), and thus operate using digital values. In other cases, the shunt regulator 118 may be designed and constructed to operate only by sensing analog representations of the bus voltages of the charging buses, or designed and constructed to operate only by receiving digital representations of the bus voltages (and possibly power delivery) of the charging buses.

The optional offset terminal 402 may be used to bias or increase the setpoint voltage developed across the cathode terminal 220 and the anode terminal 222 by a predetermined amount. For example, the designer of the power adapter 100 (FIG. 1) may want to implement a system in which the link voltage of the DC link 112 (FIG. 1) is slightly higher than the setpoint voltage otherwise selected by controller 420. The use of the bias or increase may be beneficial, for example, in cases in which the DC-DC converters are buck-only converters, to ensure the link voltage is always greater than the bus voltage of the charging buses.

Creation of the internal reference voltage VREF 422 may take any suitable form. For example, the controller 420 may use a digital-to-analog converter to create the internal reference voltage VREF 422. In other cases, the controller 420 may use a controlled-current source feeding a fixed resistor to create the internal reference voltage VREF 422, with the control input to the controlled current source set by the controller 420. One having ordinary skill in the art, with the benefit of this disclosure, could formulate multiple ways to generate the internal reference voltage VREF 422 applied to the operational amplifier 412.

Figure 5:
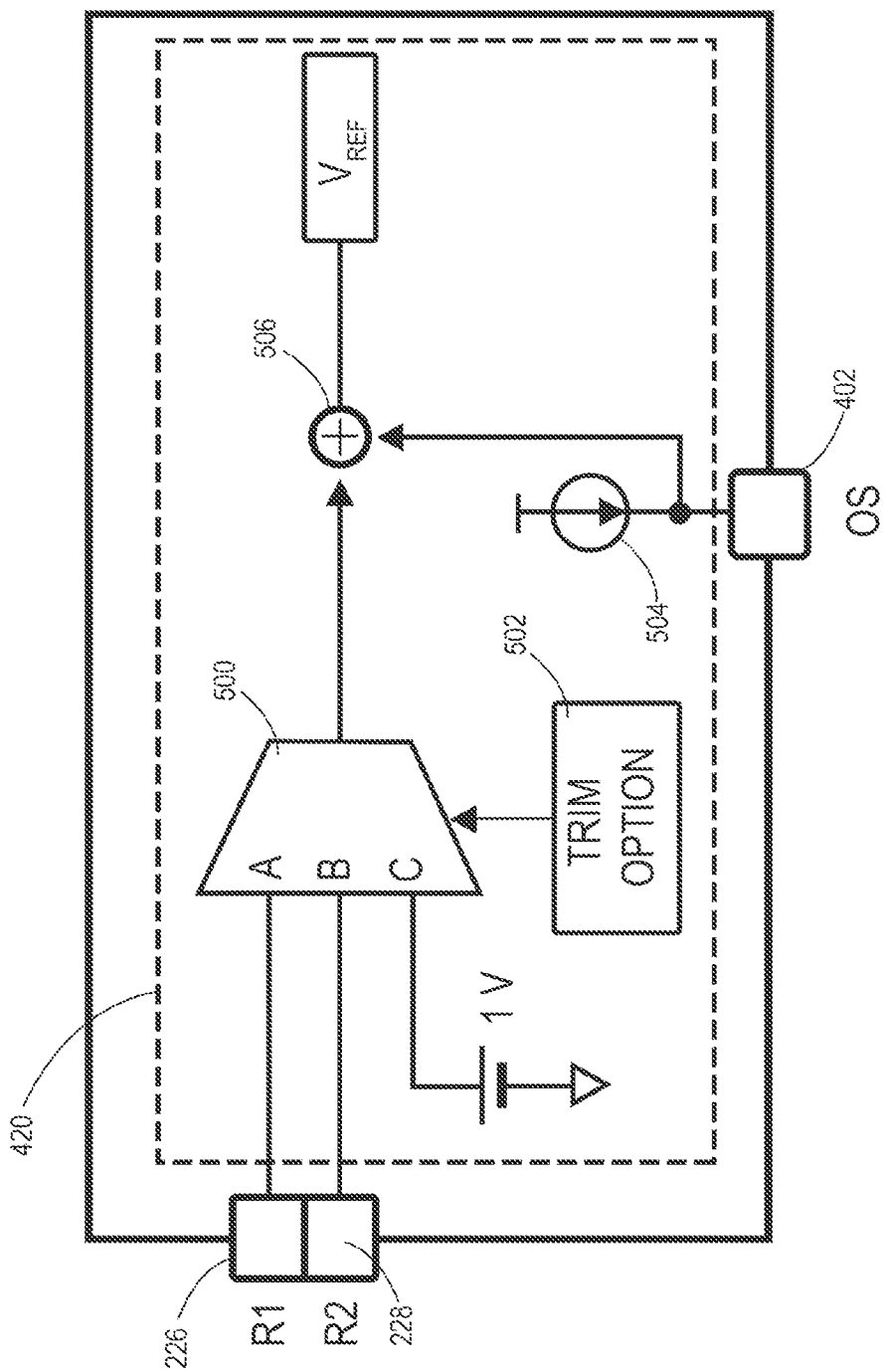
FIG. 5 shows a conceptual block diagram a controller in accordance with at least some embodiments.

FIG. 5 shows a conceptual block diagram an example controller 420. In particular, FIG. 5 shows the controller 420, the sense terminal 226, the sense terminal 228, and the offset terminal 402. FIG. 5 further shows a conceptual block diagram of operation the controller 420. In particular, FIG. 5 shows a multiplexer 500 comprising three input ports: one input port coupled to the sense terminal 226; one input port coupled to the sense terminal 228; and a third input port coupled to a fixed reference voltage, illustratively shown as 1V. The multiplexer comprises a control input coupled to a trim option logic block 502. The operation of the multiplexer 500 is dependent upon the control philosophy implemented by the controller 420, which may be selectable at the time of manufacture based on the trim option logic block 502. For example, if the control philosophy is to set the link voltage of the DC link 112 (FIG. 1) to be the same as the higher of the bus voltages of the charging buses, then the trim option logic block 502 is designed, constructed, or modified (e.g., laser scribing) to select the inputs ports (e.g., A or B) having a voltage with the greater magnitude. The selected voltage is conceptually passed to the internal reference voltage VREF 422 coupled to the operation amplifier 412 (FIG. 4). Selecting the voltage with the greater magnitude to be the internal reference voltage VREF 422 is merely an example—the example controller 420 of FIG. 5 may implement any of the variants above based on the original design, the construction, and/or the modification to the trim option logic block 502.

FIG. 5 further shows an example conceptual implementation of a lower boundary for the link voltage of the DC link 112 (FIG. 1). In particular, the example multiplexer 500 has a fixed reference voltage, in this case 1V, coupled to the third input port (labelled C). In example situations, the trim option logic block 502 may implement any of the variants above, modified in that the lower value of any selected internal reference voltage VREF 422 is bounded or capped at the lower voltage indicated by the fixed reference voltage applied to the third input of the multiplexer. For example, if the sense terminal 226 and the sense terminal 228 indicated the bus voltage of the charging busses is below 10V (e.g., one bus voltage being 3.3V, and the second being 5.0V), the example controller 420 may select the fixed reference voltage to pass through to the internal reference voltage VREF 422. Considering the voltage divider ratios above (e.g., 10:1), an internal reference voltage VREF 422 of 1.0V may result in a link voltage of the DC link 112 to be 10V in spite of both bus voltages of the charging buses being below 10V. Other lower boundary reference voltages may be used, possibly selected based on the efficacy of the of the AC-DC converter 102.

FIG. 5 also shows an example implementation of the bias or increase to the setpoint voltage developed across the cathode terminal 220 and the anode terminal 222 associate with the offset terminal 402. In particular, in the example implementation a current source 504 has first connection coupled to a rail voltage, and a second connection coupled to the offset terminal 402. The second connection is also coupled to a summation block 506. The summation block 506 sums an initial internal reference voltage selected by the multiplexer 500 with the voltage at the offset terminal 402, and the resultant becomes the internal reference voltage VREF 422. Referring simultaneously to FIGS. 2 and 5, the designer of the power adapter 100 may optionally bias the internal reference voltage VREF 422 (and thus bias the setpoint voltage) by selection of the resistor 250 coupled between the offset terminal 402 and the common on the secondary side 116.

FIG. 5 implies an analog implementation for the controller 420; however, the functionality may be implemented in whole or in part in instructions executed by a processor, microprocessor, microcontroller, or any other programmable circuit that can be implemented within the controller 420.

Returning briefly to FIG. 3. As discussed above, in example cases the DC-DC converters may be buck-boost converters, but in other cases the DC-DC converters may be buck-only converters. In the case of buck-only DC-DC converters, and when the shunt regulator 118 receives values indicative of bus voltages of the charging buses by way of one or more communication channels, the USB-PD controller 136 is designed and constructed to facility the use of buck-only DC-DC converts by timing of communication among the shunt regulator 118 and the DC-DC converters 104 and 106. For example, in the buck-only case, once the USB-PD controller 136 determines bus voltages for the charging buses, the USB-PD controller first communicates the values indicative of the bus voltages to the shunt regulator 118. The shunt regulator 118, in turn, makes its selection for the link voltage of the DC link 112, and implements the selection. Either by expiration of the predetermined amount of time, or by return communication from the USB-PD controller 136, the USB-PD controller 136 waits to ensure a link voltage rises above the highest negotiated bus voltage for the charging buses to ensure buck-only operation of the DC-DC converters 104.

Figure 6:
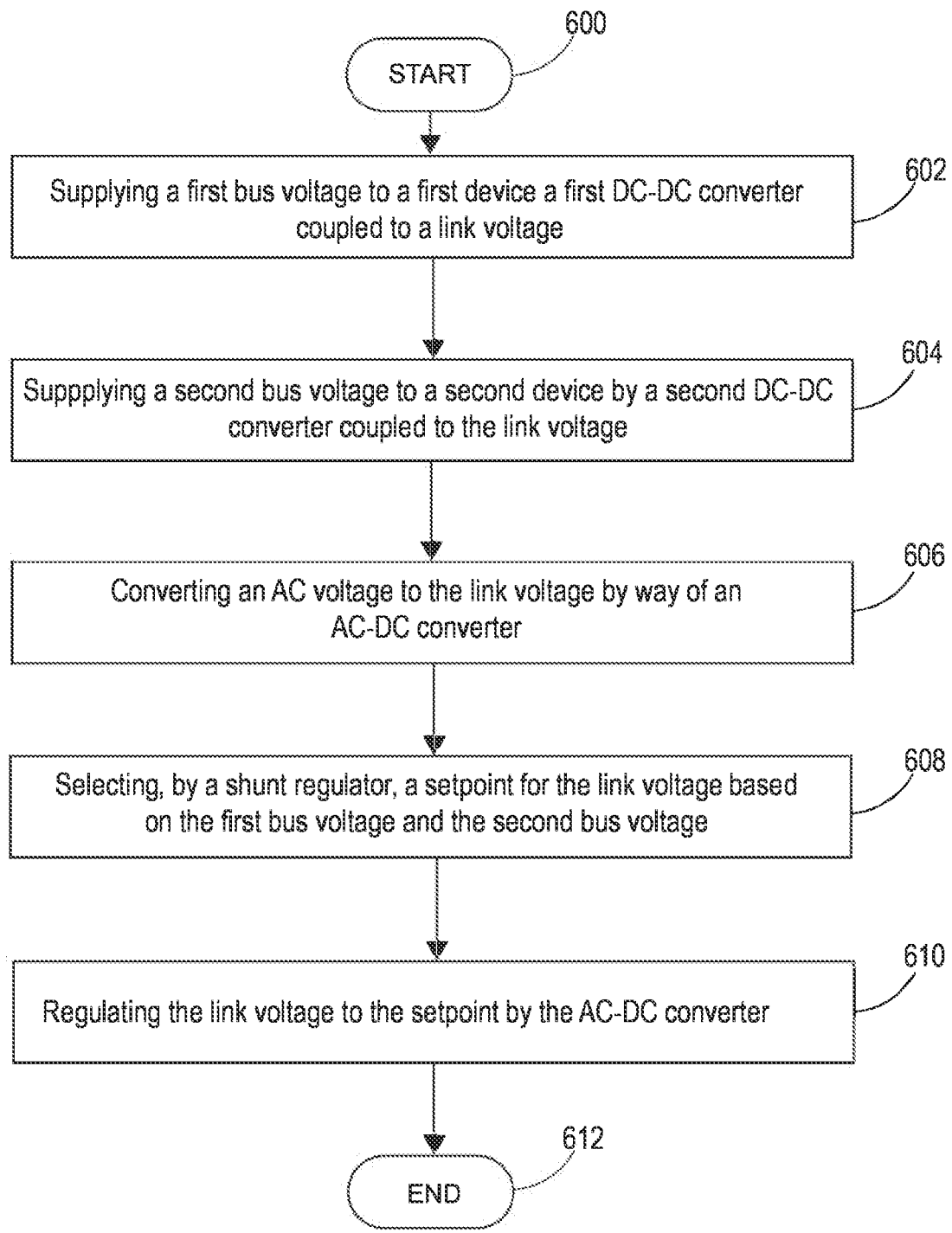
FIG. 6 shows a method in accordance with at least some embodiments.

FIG. 6 shows a method in accordance with at least some embodiments. In particular, the method starts (block 600) and comprises: supplying a first bus voltage to a first device by a first DC-DC converter coupled to a link voltage (block 602); supplying a second bus voltage to a second device by a second DC-DC converter coupled to the link voltage (block 604); converting an AC voltage to the link voltage by way of an AC-DC converter (block 606); selecting, by a shunt regulator, a setpoint for the link voltage based on the first bus voltage and the second bus voltage (block 608); and regulating the link voltage to the setpoint by the AC-DC converter (block 610). Thereafter the method ends (block 612). The order the steps of FIG. 6 shall not necessarily imply an order of implementation. For example, in the analog cases (and with buck-boost DC-DC converters) the bus voltages to the charging buses may be supplied before the shunt regulator makes a selection for the setpoint for the link voltage. Before the selection, the link voltage may be at a default voltage, or may the voltage from a previous selection. In the digital cases, the selecting of the link voltage and regulating the link voltage may take place before supplying (or changing) the bus voltages of the charging buses.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A shunt regulator comprising:
    a cathode terminal, an anode terminal, a reference terminal, a first sense terminal, and a second sense terminal;
    a semiconductor circuit defining an anode coupled to the anode terminal, a cathode coupled to the cathode terminal, and a control input;
    an operation amplifier defining a first input coupled to the reference terminal, a second input, and a control output coupled to the control input;
    a controller coupled to the first sense terminal, the second sense terminal, and the second input, the controller configured to:
        sense, by way of the first sense terminal, a first bus voltage;
        sense, by way of the second sense terminal, a second bus voltage; and
        create a signal indicative of a setpoint voltage across the cathode terminal and anode terminal, the controller configured to create the signal by selecting an internal reference voltage driven to the second input of the operational amplifier, the internal reference voltage selected based on the first bus voltage and the second bus voltage.

2. The shunt regulator of claim 1:
wherein when the controller senses the first bus voltage, the controller is further configured to sense, by way of the first sense terminal, an analog signal indicative of the first bus voltage supplied to a first charging port;
wherein when the controller senses the second bus voltage, the controller is further configured to sense, by way of the second sense terminal, an analog signal indicative of the second bus voltage supplied to a second charging port; and
wherein when the controller selects the internal reference voltage, the controller is further configured to generate the internal reference voltage based on the signal indicative of the first bus voltage and the signal indicative of the second bus voltage.

3. The shunt regulator of claim 1 further comprising:
wherein when the controller senses the first bus voltage, the controller is further configured to receive a value indicative of the first bus voltage by way of a communication channel associated with the first sense terminal;
wherein when the controller senses the second bus voltage, the controller is further configured to receive a value indicative of the second bus voltage by way of a serial communication channel associated with the second sense terminal; and
wherein when the controller selects the internal reference voltage, the controller is further configured to generate the internal reference voltage based on the value indicative of the first bus voltage and the value indicative of the second bus voltage.

4. The shunt regulator of claim 1 further comprising:
wherein when the controller senses the first bus voltage and senses the second bus voltage, the controller is further configured to receive a value indicative of a setpoint voltage across the cathode terminal and anode terminal by way of a communication channel comprising the first sense terminal and the second sense terminal;
wherein when the controller selects the internal reference voltage, the controller is further configured to generate the internal reference voltage based on the a value indicative of a setpoint voltage across the cathode terminal and anode terminal.

5. The shunt regulator of claim 1 further comprising:
wherein when the controller senses the first bus voltage, the controller is further configured to receive a value indicative of the first bus voltage and a value indicative of a first bus power by way of a communication channel associated with the first sense terminal;
wherein when the controller senses the second bus voltage, the controller is further configured to receive a value indicative of the second bus voltage and a value indicative of a second bus power by way of a communication channel associated with the second sense terminal; and
wherein when the controller selects the internal reference voltage, the controller is further configured to generate the internal reference voltage based on the value indicative of the first bus power and the second bus power.

6. The shunt regulator of claim 5 wherein generating the internal reference voltage further comprises generating the internal reference voltage such that the signal indicative of the setpoint voltage results in a link voltage that is the same or higher than the first or the second bus voltage delivering higher power.

7. The shunt regulator of claim 1 further comprising:
an offset terminal coupled to the controller; and
the controller further configured to bias the internal reference voltage based on a voltage on or current through the offset terminal.

* * * * *